(12) United States Patent
Noyek (10) Patent No.: US 10,815,960 B2
(45) Date of Patent: Oct. 27, 2020

(54) WAVE ENERGY CONVERTER

(71) Applicant: Matthew Noyek, Guangdong (CN)

(72) Inventor: Matthew Noyek, Guangdong (CN)

( * ) Notice: Subject to any disclaimer, the term of this patent is extended or adjusted under 35 U.S.C. 154(b) by 128 days.

(21) Appl. No.: 16/320,018

(22) PCT Filed: Aug. 5, 2016

(86) PCT No.: PCT/CN2016/093622
§ 371 (c)(1),
(2) Date: Jan. 23, 2019

(87) PCT Pub. No.: WO2018/023731
PCT Pub. Date: Feb. 8, 2018

(65) Prior Publication Data
US 2019/0271292 A1    Sep. 5, 2019

(51) Int. Cl.
*F03B 13/18*    (2006.01)
*F03B 13/20*    (2006.01)

(52) U.S. Cl.
CPC .......... *F03B 13/1885* (2013.01); *F03B 13/20* (2013.01); *F05B 2230/60* (2013.01); *F05B 2230/6102* (2013.01); *F05B 2260/02* (2013.01); *Y02E 10/38* (2013.01)

(58) Field of Classification Search
CPC ...... Y02E 10/38; F03B 13/18; F03B 13/1885; F03B 13/20; F03B 13/12–22; F05B 2230/6102; F05B 2230/60; F05B 2260/02; F05B 2240/142; F05B 2240/93; F05B 2240/97; F05B 2270/18; B63B 22/04; B63B 22/08; B63B 2021/505; B63B 75/00; B63B 77/00; B63B 77/10
See application file for complete search history.

(56) References Cited

U.S. PATENT DOCUMENTS

| 4,222,682 A | 9/1980 | Vilain | |
| 4,954,052 A * | 9/1990 | Simmons | F03B 13/189 |
| | | | 417/331 |
| 2011/0155039 A1* | 6/2011 | Moore | F03B 13/14 |
| | | | 114/326 |
| 2015/0000263 A1* | 1/2015 | Foster | F03B 13/16 |
| | | | 60/504 |
| 2016/0053738 A1* | 2/2016 | Fievez | F03B 13/189 |
| | | | 60/327 |
| 2017/0356416 A1* | 12/2017 | Fan | F03B 13/183 |

FOREIGN PATENT DOCUMENTS

| CN | 102027229 A | 4/2011 |
| CN | 102174802 A | 9/2011 |
| CN | 103452743 A | 12/2013 |
| FR | 2977596 A1 | 1/2013 |
| WO | 2011126451 A1 | 10/2011 |

OTHER PUBLICATIONS

PCT International Search Report and Written Opinion, Application No. PCT/CN2016/093622, dated May 10, 2017.
EP Extended Search Report, Application No. 16911326.3, dated Dec. 11, 2019.

* cited by examiner

*Primary Examiner* — Mark A Laurenzi
*Assistant Examiner* — Xiaoting Hu (57) ABSTRACT

A wave energy converter includes a floating portion and an anchor portion, wherein the anchor portion includes a transport support structure configured to carry the floating portion.

38 Claims, 6 Drawing Sheets

WAVE ENERGY CONVERTER

CROSS-REFERENCE TO RELATED APPLICATIONS

This application is the National Phase of International Application PCT/CN2016/093622 filed Aug. 5, 2016, which designated the U.S. That International Application was published in English under PCT Article 21(2) on Feb. 8, 2018 as International Publication Number WO 2018/023731A1. The disclosure of that application is incorporated herein by reference.

BACKGROUND OF THE INVENTION

This disclosure relates to a wave energy converter, and in particular, but not exclusively, relates to a land-portable wave energy converter and method of deployment thereof.

INTRODUCTION

The energy of waves can be captured and converted into electricity by a wave energy converter (WEC) to provide a sustainable source of energy. There are many different types of WECs which have been developed to convert wave energy from shallow waters and deeper waters offshore. The different types of WEC include point absorbers, attenuators, oscillating wave surge converters, oscillating water column devices, over-topping devices and submerged pressure differential devices, amongst others.

One of the problems associated with a wave energy device is the deployment of the device at sea. For example, a WEC must be transported to an appropriate point offshore, and subsequently deployed in the water. It is desirable, therefore, that the WEC be easily packaged and transported, both on land and at sea.

Furthermore, once the WEC has been transported to an appropriate deployment location, it is common for the WEC to be attached to an anchoring device, so that the WEC does not move away from its intended location. In order to attach the WEC to the anchoring device, a mooring line is used to attach a floating portion of the WEC to the anchoring device, which requires one or more assembly operations on board the vessel that is used to transport the WEC.

SUMMARY OF THE INVENTION

According to an aspect of the present disclosure there is provided a marine-deployable device, for example a wave energy converter, comprising a floating portion and an anchor portion, wherein the anchor portion comprises a transport support structure configured to carry the floating portion. For example, the transport support structure may be a portable, or more specifically a land-portable, support structure configured to carry the floating portion.

The floating portion may have a centre of buoyancy that is laterally offset from the centroid of the floating portion by a distance of at least 5 percent of a maximum lateral dimension of the floating portion. It is understood that the position of the centre of buoyancy of the floating portion may be determined when the floating portion is in water. In a state of equilibrium, when the floating portion is in water the centre of buoyancy of the floating portion is vertically aligned with the centre of mass of the floating portion. The centre of buoyancy may be offset by a sufficient amount to cause one side, for example a fore side, of the floating portion to sit substantially lower in the water than another side, for example an aft side, of the floating portion. As a result of the fore side of the floating portion sitting lower in the water, the fore side of the floating portion has a smaller surface area above the surface of the water than the aft side, for example when the floating portion is cuboid in shape. The centre of buoyancy may be offset towards the fore side of the floating portion. The fore side of the floating portion may be configured to face the prevailing wind and/or waves, when the floating portion is deployed at sea. In the context of the present disclosure, the term "fore" is understood to mean the upstream side, or end, of the floating portion on which waves strike the floating portion. In the context of the present disclosure, the term "aft" is understood to mean the downstream side, or end, of the floating portion relative to a prevailing current.

The floating portion may be ballasted to offset the centre of mass of the floating portion laterally away from the centroid of the floating portion. The ballast may be located such that the centre of mass of the floating portion is offset by a distance of at least 5 percent of a maximum lateral dimension of the floating portion. It is understood, therefore, that the floating portion is configured such that the centre of mass of the floating portion is significantly shifted away from the centroid of the floating portion to cause the floating portion to sit in a tilted position when deployed in water.

The floating portion may comprise one or more ballast chambers. The one or more ballast chambers may each comprise at least one recess configured to fill with water upon deployment of the floating portion. For example, the floating portion may have a first centre of gravity located towards the centroid of the floating portion when the ballast chambers are not full of water, and a second centre of gravity located further away from the centroid of the floating portion when the ballast chambers are at least partially full of water. The filling of the ballast chambers with water may cause the centre of gravity of the floating portion to shift away from the centroid of the floating portion, for example in a direction towards the fore of the floating portion. As a result of the ballast chambers filling with water, the centre of buoyancy of the floating portion becomes laterally offset from the centroid of the floating portion, which causes the floating portion to tilt in the water.

The transport support structure may comprise a pallet. The transport support structure may comprise a skid. The transport support structure may comprise a frame configured to support the floating portion.

The wave energy converter may have a transport configuration in which the floating portion is mounted on the anchor portion. The wave energy converter may have a deployed configuration in which the floating portion is separated from the anchor portion.

The anchor portion may be configured to function as a base of the wave energy converter when the wave energy converter is in the transport configuration. The anchor portion may comprise at least one lifting feature, for example an opening, configured to engage a lifting assembly of a mechanical handler, such as a fork or tine of a mechanical handler. The anchor portion may comprise at least one lifting feature, for example a projection, configured to engage a lifting assembly of a mechanical handler. The anchor portion may be configured to be carried using one or more types of conventional lifting devices, such as a forklift machine. In this manner, the wave energy converter is configured such that conventional machinery may be used to handle the wave energy converter without adaptation when the wave energy converter is in the transport configuration, i.e. when the floating portion is mounted on the anchor portion.

The wave energy converter may comprise a securing mechanism configured to removably secure the floating portion to the anchor portion. For example, the securing mechanism may comprise one or more securing members configured to releasably secure the floating portion to the anchor portion. The release of the securing mechanism may allow the wave energy converter to change from the transport configuration to the deployed configuration. The release of the securing mechanism may allow the ballast chambers of the floating portion to fill with water.

The floating portion may comprise a housing that is substantially cuboid in form. The floating portion may be configured such that a bottom face of the floating portion has a larger overall area than a side face of the floating portion. The side face of the floating portion may be configured to engage a top face of the anchor portion. The transport configuration of the wave energy converter may be defined upon engagement of the side face of the floating portion and the top face of the anchor portion. For example, a vertical plane of the floating portion may be perpendicular, or near to perpendicular, to a vertical plane of the anchor portion when the wave energy converter is in the transport configuration.

The total volume of the floating portion may be greater than the total volume of the anchor portion. A side profile of the floating portion may be substantially similar to a top profile of the anchor portion. In this manner, the side face of the floating portion may be aligned with the top face of the anchor portion such that the floating portion does not overhang the edges of the anchor portion when the wave energy converter is in the transport configuration.

The wave energy converter may have an overall height less than the height of the opening to, for example the height of the door aperture of, an International Organization for Standardization (ISO) shipping container when the wave energy converter is in the transport configuration. For example, the wave energy converter may have an overall height less than approximately 7 feet 5 inches (2.261 m) when the wave energy converter is in the transport configuration. In another example, the wave energy converter may have an overall height less than approximately 8 feet 5½ inches (2.578 m) when the wave energy converter is in the transport configuration. In this manner, the wave energy converter is configured to fit through the opening of an ISO shipping container when the wave energy converter is in an upright orientation.

The wave energy converter may have an overall width less than the width of the opening to, for example the width of the door aperture of, an ISO shipping container when the wave energy converter is in the transport configuration. For example, the wave energy converter may have an overall width less than approximately 7 feet 3 inches (2.210 m). In another example, the wave energy converter may have an overall width less than approximately 7 feet 8 inches (2.337 m) when the wave energy converter is in the transport configuration. In this manner, the wave energy converter is configured to fit through the opening of an ISO shipping container when the wave energy converter is in an upright orientation.

It is understood, however, that the dimensions, such as the height and the width of the door aperture, of an ISO shipping container may depend on the intended use of the shipping container, and may not be fixed values. For example, ISO 668 regulates the external dimensions and the internal dimensions of a plurality of differently configured shipping containers, in combination with the minimum door aperture size of those shipping containers. The wave energy converter may be sized according to ISO 668, and/or any other appropriate standard, so that the wave energy converter fits through the smallest possible door aperture dimensions of an ISO shipping container.

The floating portion may be sufficiently buoyant to support the weight of the anchor portion when deployed in water. For example, the wave energy converter may be configured to float when the floating portion is mounted to the anchor portion.

The floating portion and the anchor portion may be connected by a mooring line assembly, for example in addition to or instead of the connection between the floating portion and the anchor portion defined by the securing mechanism. The mooring line assembly may comprise at least a drive line, an anchor line, a re-station line, a tethering line, one or more weights, one or more floats and one or more connectors. The drive line, the anchor line, the re-station line and the tethering line may each be connectable to at least one other line of the mooring line assembly by virtue of at least one of the connectors.

The anchor line may be configured to connect the anchor portion to the drive line. The drive line may be connected, for example directly connected, to the floating portion. The drive line may comprise a first end connectable to the anchor line. The drive line may comprise a second end connectable to the re-station line. The mooring line assembly may have an ascending portion that extends from the anchor portion to the floating portion when the wave energy converter is in the deployed configuration. The mooring line assembly may have a descending portion that extends from the floating portion to the re-station line when the wave energy converter is in the deployed configuration. The ascending portion and the descending portion may be connected by virtue of the tethering line.

The wave energy converter may be packaged so that the mooring line assembly is attached to the floating portion and the anchor portion when the wave energy converter is in the transport configuration. In other words, the mooring line assembly may be packaged at least partially within the wave energy converter in the transport configuration such that mooring line assembly is already attached to the anchor portion and the floating portion in an operable configuration. For example, an end of the anchor line may be coupled to the anchor portion and the drive line may be coupled to the floating portion in the packaged state. In this manner, the mooring line may be attached to the floating portion and the anchor portion in a ready-to-use configuration, so that the mooring line assembly may be installed to the wave energy converter at the point of manufacture, with no further assembly operation being required to deploy the wave energy converter, i.e. in a manner that allows the wave energy converter to change from the transport configuration to the deployed configuration without any further assembly operation. The wave energy converter may be "water-ready" when in the transport configuration.

The wave energy convertor may comprise at least one projection configured to locate the mooring line assembly when the mooring line assembly is stowed on the wave energy converter. The mooring line assembly may be deployed from the wave energy converter upon separation of the floating portion from the anchor portion. For example, separation of the floating portion from the anchor portion may cause the mooring line assembly to be released from the at least one projection. The wave energy converter may comprise a recess, for example a storage compartment, configured to stow the mooring line assembly. The anchor portion may comprise at least a portion of the recess. The floating portion may comprise at least a portion of the recess.

The anchor portion may comprise one or more anchors, for example one or more deadweight anchors and/or one or more drag-embedment anchors. The anchor portion may comprise a set of nested anchors. The anchor portion may comprise one or more heave plates. The anchor portion may comprise one or more mushroom anchors. The mushroom anchor may comprise a collapsible shank. The anchor line may be coupled to, for example fixedly coupled to, at least one anchor and/or one or more heave plate. The anchor line may be coupled to, for example extend though, at least one anchor and/or one or more heave plate.

The floating portion comprises a power take-off system. For example, the floating portion may comprise an electrical generator having an input shaft configured to be driven by the drive line of the mooring line assembly. The power take-off system may comprise one or more gear boxes, clutches and/or hydraulic mechanisms configured to couple the input shaft to the generator. The rotational axis of the input shaft of the power take-off may be offset laterally from the centroid of the floating portion, for example towards a fore side of the floating portion. A spool may be connected to the input shaft. The mooring line assembly may couple the anchor portion to the floating portion by virtue of the interaction between the spool and the drive line of the mooring line assembly.

The floating portion may comprise a channel extending through the floating portion. The channel may be configured to bisect the floating portion, for example into two bodies of approximately equal size. At least a portion of an input shaft of a power take-off of the floating portion may be disposed in the channel. For example, the input shaft may be housed in the floating portion so that it extends between the two bodies of the floating portion. The channel may extend in a direction perpendicular to the rotational axis of the input shaft.

The floating portion may comprise one or more internal recesses, for example ballast chambers, which may be configured to fill with water upon deploying the wave energy converter. When the internal chambers are filled with water, they may provide ballast and help to tilt the floating portion to a desired angle of tilt. The internal recesses may be configured to control the amount of water, and therefore ballast, taken on board the floating portion upon deployment of the floating portion in the water. An advantage of providing the floating portion with internal recesses is that the floating portion is provided with a source of cooling water which may be used in a heat exchanger configured to cool one or more components of a power take-off system of the wave energy converter.

According to another aspect of the present disclosure there is provided a method of deploying a wave energy converter comprising a floating portion and an anchor portion, the anchor portion comprising a transport support structure, the method comprising: carrying the floating portion using the anchor portion.

The method may comprise offsetting laterally the centre of buoyancy of the floating portion from the centroid of the floating portion by a distance of at least 5 percent of a maximum lateral dimension of the floating portion.

The method may comprise securing the anchor portion to the floating portion to define a transport configuration of the wave energy converter. The method may comprise launching the wave energy converter into water. The method may comprise releasing the anchor portion from the floating portion to define a deployed configuration of the wave energy converter.

The method may comprise releasing the anchor portion from the floating portion to cause the floating portion to re-orientate in the water.

The method may comprise releasing the anchor portion from the floating portion to cause the anchor portion to fall into the water.

The anchor portion and the floating portion may be connected by a mooring line assembly. The method may comprise releasing the anchor portion from the floating portion to cause the mooring line assembly to be deployed from the wave energy converter.

According to another aspect of the present disclosure there is provided a marine deployable device, for example a wave energy converter, comprising a floating portion, wherein the floating portion has a centre of buoyancy that is laterally offset from the centroid of the floating portion by a distance of at least 5 percent of a maximum lateral dimension of the floating portion.

The floating portion may have a centre of buoyancy that is laterally offset from the centroid of the floating portion by a distance of at least 5 percent of a maximum lateral dimension of the floating portion, when the floating portion is in water. The centre of buoyancy may be offset by a sufficient amount to cause one side, for example a fore side, of the floating portion to sit substantially lower in the water than another side, for example an aft side, of the floating portion. As a result of the fore side of the floating portion sitting lower in the water, the fore side of the floating portion has a smaller surface area above the surface of the water than the aft side, for example when the floating portion is cuboid in shape. The centre of buoyancy may be offset towards the fore side of the floating portion. The floating portion may be configured such that the fore side of the floating portion faces the prevailing wind and/or waves, when the floating portion is deployed at sea.

The floating portion may be ballasted to offset the centre of mass of the floating portion laterally away from the centroid of the floating portion. The ballast may be located such that the centre of mass of the floating portion is offset by a distance of at least 5 percent of a maximum lateral dimension of the floating portion. It is understood, therefore, that the floating portion is configured such that the centre of mass of the floating portion is significantly shifted away from the centroid of the floating portion to cause the floating portion to sit in a tilted position when deployed in water.

The floating portion may comprise one or more ballast chambers. The one or more ballast chambers may each comprise at least one recess, such as a chamber, configured to fill with water upon deployment of the floating portion. For example, the floating portion may have a first centre of gravity located towards the centroid of the floating portion when the ballast chambers are not full of water, and a second centre of gravity located further away from the centroid of the floating portion when the ballast chambers are at least partially full of water. The filling of the ballast chambers with water may cause the centre of gravity of the floating portion to shift away from the centroid of the floating portion, for example in a direction towards the fore of the floating portion. As a result of the ballast chambers filling with water, the centre of buoyancy of the floating portion moves laterally away from the centroid of the floating portion, which causes the floating portion to tilt in the water.

The wave energy converter may comprise an anchor portion. The wave energy converter may be configured such that the floating portion and the anchor portion are operationally coupled to generate power as the floating portion moves relative to the anchor portion.

The anchor portion may comprise a transport support structure configured to carry the floating portion. The transport support structure may comprise a pallet. The transport support structure may comprise a skid. The transport support structure may comprise a frame configured to support the floating portion.

The wave energy converter may have a transport configuration in which the floating portion is mounted on the anchor portion. The wave energy converter may have a deployed configuration in which the floating portion is separated from the anchor portion.

The anchor portion may be configured to function as a base of the wave energy converter when the wave energy converter is in the transport configuration. The anchor portion may comprise at least one lifting feature, for example an opening, configured to engage a fork or tine of a mechanical handler, such as a forklift machine. The anchor portion may comprise at least one lifting feature, for example a projection, configured to engage a lifting assembly of a mechanical handler. The anchor portion may be configured to be carried using one or more types of conventional lifting devices, such as a forklift machine. In this manner, the wave energy converter is configured such that conventional machinery may be used to handle the wave energy converter, without adaptation, when the wave energy converter is in the transport configuration, i.e. when the floating portion is mounted on the anchor portion.

The wave energy converter may comprise a securing mechanism configured to removably secure the floating portion to the anchor portion. For example, the securing mechanism may comprise one or more securing members configured to releasably secure the floating portion and the anchor portion. The release of the securing mechanism may allow the wave energy converter to change from the transport configuration and the deployed configuration. The release of the securing mechanism may allow the ballast chambers of the floating portion to fill with water.

The floating portion may comprise one or more housings that are substantially cuboid in form. The floating portion may be configured such that a bottom face of the floating portion has a larger overall area than a side face of the floating portion. The side face of the floating portion may be configured to engage a top face of the anchor portion. The transport configuration of the wave energy converter may be defined upon engagement of the side face of the floating portion and the top face of the anchor portion. For example, a vertical plane of the floating portion may be perpendicular, or near perpendicular, to a vertical plane of the anchor portion when the wave energy converter is in the transport configuration.

The overall volume of the floating portion may be greater than the overall volume of the anchor portion. A side profile of the floating portion may be substantially similar to a top profile of the anchor portion. In this manner, the side face of the floating portion may be aligned with the top face of the anchor portion such that the floating portion does not overhang the edges of the anchor portion when the wave energy converter is in the transport configuration.

The wave energy converter may have an overall height less than the height of the opening to an International Organization for Standardization (ISO) shipping container when the wave energy converter is in the transport configuration. For example, the wave energy converter may have an overall height less than approximately 7 feet 5 inches (2.261 m) when the wave energy converter is in the transport configuration. In another example, the wave energy converter may have an overall height less than approximately 8 feet 5½ inches (2.578 m) when the wave energy converter is in the transport configuration. In this manner, the wave energy converter is configured to fit through the opening of an ISO shipping container when the wave energy converter is in an upright orientation.

The wave energy converter may have an overall width less than the width of the opening to an ISO shipping container when the wave energy converter is in the transport configuration. For example, the wave energy converter may have an overall width less than approximately 7 feet 3 inches (2.210 m) when the wave energy converter is in the transport configuration. In another example, the wave energy converter may have an overall width less than approximately 7 feet 8 inches (2.337 m) when the wave energy converter is in the transport configuration. In this manner, the wave energy converter is configured to fit through the opening of an ISO shipping container when the wave energy converter is in an upright orientation.

The floating portion may be sufficiently buoyant to support the weight of the anchor portion when deployed in water. For example, the wave energy converter may be configured to float when the floating portion is mounted to the anchor portion. The wave energy converter may be configured to float when the floating portion is mounted to the anchor portion and when at least one of, or all of, the ballast chambers are full of water.

The floating portion and the anchor portion may be connected by a mooring line assembly, for example in addition to or instead of the connection between the floating portion and the anchor portion defined by the securing mechanism. The mooring line assembly may comprise at least a drive line, an anchor line, a re-station line, a tethering line, one or more weights, one or more floats and one or more connectors. The drive line, the anchor line, the re-station line and the tethering line may each be connectable to at least one other line of the mooring line assembly by virtue of at least one of the connectors.

The anchor line may be configured to connect the anchor portion to the drive line. The drive line may be connected, for example directly connected, to the floating portion. The drive line may comprise first end connectable to the anchor line. The drive line may comprise a second end connectable to the re-station line. The mooring line assembly may have an ascending portion that extends from the anchor portion to the floating portion when the wave energy converter is in the deployed configuration. The mooring line assembly may have a descending portion that extends from the floating portion to the re-station line when the wave energy converter is in the deployed configuration. The ascending portion and the descending portion may be connected by virtue of the tethering line.

The wave energy converter may be packaged so that the mooring line assembly is attached to the floating portion and the anchor portion when the wave energy converter is in the transport configuration. In other words, the mooring line assembly may be packaged at least partially within the wave energy converter in the transport configuration such that mooring line assembly is already attached to the anchor portion and the floating portion in an operable configuration. For example, an end the anchor line may be coupled to the anchor portion and the drive line may be coupled to the floating portion in the packaged state. In this manner, the mooring line assembly may be attached to the floating portion and the anchor portion in a ready-to-use configuration, so that the mooring line assembly may be installed to the wave energy converter at the point of manufacture, with no further assembly operation being required to deploy the wave energy converter, i.e. in a manner that allows the wave energy converter to change from the transport configuration to the deployed configuration without any further assembly operation. The wave energy converter may be "water-ready" when in the transport configuration.

The wave energy convertor may comprise at least one projection configured to locate the mooring line assembly when the mooring line assembly is stowed on the wave energy converter. The mooring line assembly may be deployed from the wave energy converter upon separation of the floating portion from the anchor portion. For example, separation of the floating portion from the anchor portion may cause the mooring line assembly to be released from the at least one projection. The wave energy converter may comprise a recess, for example a storage compartment, configured to stow the mooring line assembly. The anchor portion may comprise the at least a portion of the recess. The floating portion may comprise at least a portion of the recess.

The anchor portion may comprise one or more anchors, for example one or more deadweight anchors and/or one or more drag-embedment anchors. The anchor portion may comprise a set of nested anchors. The anchor portion may comprise one or more heave plates. The anchor portion may comprise one or more mushroom anchors. The mushroom anchor may comprise a collapsible shank. The anchor line may be coupled to, for example fixedly coupled to, at least one anchor. The anchor line may be coupled to, for example extend though, at least one anchor.

The floating portion comprises a power take-off system. For example, the floating portion may comprise an electrical generator having an input shaft configured to be driven by the drive line of the mooring line assembly. The power take-off system may comprise one or more gear boxes, clutches and/or hydraulic mechanisms configured to couple the input shaft to the generator. The rotational axis of the input shaft of the power take-off may be offset laterally from the centroid of the floating portion, for example towards a fore side of the floating portion. A spool may be connected to the input shaft. The mooring line assembly may couple the anchor portion to the floating portion by virtue of the interaction between the spool and the drive line of the mooring line assembly.

The floating portion may comprise a channel extending through the floating portion. The channel may be configured to bisect the floating portion, for example into two bodies of approximately equal size. At least a portion of the input shaft of the power take-off may be disposed in the channel. For example, the input shaft may be housed in the floating portion so that it extends between the two bodies of the floating portion. The channel may extend in a direction perpendicular to the rotational axis of the input shaft.

The floating portion may comprise one or more internal recesses, for example ballast chambers, which may be configured to fill with water upon deploying the wave energy converter. When the internal chambers are filled with water, they may provide ballast and help to tilt the floating portion to a desired angle of tilt. The internal recesses may be configured to control the amount of water, and therefore ballast, taken on board the floating portion upon deployment of the floating portion in the water. An advantage of providing the floating portion with internal recesses is that the floating portion is provided with a source of cooling water which may be used in a heat exchanger configured to cool one or more components of a power take-off system of the wave energy converter.

According to another aspect of the present invention there is provided a method of orientating a wave energy converter, the method comprising: offsetting laterally the centre of buoyancy of a floating portion of the wave energy converter from the centroid of the floating portion by a distance of at least 5 percent of a maximum lateral dimension of the floating portion, so that the wave energy converter sits tilted in the water.

The wave energy converter may comprise an anchor portion, for example an anchor portion having a transport support structure. The method may comprise carrying the floating portion using the anchor portion.

The method may comprise securing the anchor portion to the floating portion to define a transport configuration of the wave energy converter. The method may comprise launching the wave energy converter into water. The method may comprise releasing the anchor portion from the floating portion to define a deployed configuration of the wave energy converter.

The method may comprise releasing the anchor portion from the floating portion to cause the floating portion to re-orientate in the water.

The method may comprise the releasing the anchor portion from the floating portion to cause the anchor portion to fall into the water.

The anchor portion and the floating portion may be connected by a mooring line assembly. The method may comprise the releasing the anchor portion from the floating portion to cause the mooring line assembly to be deployed from the wave energy converter.

According to another aspect of the present disclosure there is provided a wave energy converter, comprising a floating portion and an anchor portion, the floating portion having a centre of gravity and/or centre of buoyancy to cause a horizontal plane of the floating portion to be inclined to the horizontal plane of the water when the floating portion is deployed in water.

According to another aspect of the present disclosure there is provided an anchor portion for a marine device, the anchor comprising one or more openings configured to engage a fork or tine of a mechanical handler, such as a fork lift device.

In the context of the present disclosure, the term "anchor portion" is understood to mean any portion of the wave energy converter that may be used to control and/or limit the range of movement of the wave energy converter when deployed in water. For example, the anchor portion may comprise an anchor, for example a heavy object attached to the mooring line assembly that can be used to moor the wave energy converter to the sea bottom. The anchor portion may comprise a transport support structure that can be used to move the floating portion, for example when the wave energy converter is on land or the deck of a marine vessel. The anchor portion may comprise one or more heave plates that are configured to be used in combination with at least one anchor. The present disclosure is advantageous as the anchor and the transport support structure may be the same article. Additionally or alternatively, the transport support structure may be coupled to one or more separate anchors, which may or may not be supplied as part of the wave energy converter in the transport configuration. Additionally or alternatively, the transport support structure and a heave plate assembly may be the same article.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

The present disclosure addresses the problems associated with the transportation and deployment of a floating marine device, such as a wave energy converter 101. In particular, the present disclosure provides a system and method to improve transportation of the wave energy converter 101 from a manufacturing site on land to a launch site in open water. The present disclosure is also advantageous as it provides an improved system and method of deploying the wave energy converter 101 when at a desired launch site. For example, the wave energy converter 101 may be configured such that it may leave a manufacturing facility and be deployed in water without any additional manufacturing or assembly operations. In other words, the wave energy converter 101 embodies a "just add water" principle, which can reduce transportation time and cost, and simplify the procedure associated with launching the wave energy converter 101 from a marine vessel into the water.

Figure 1:
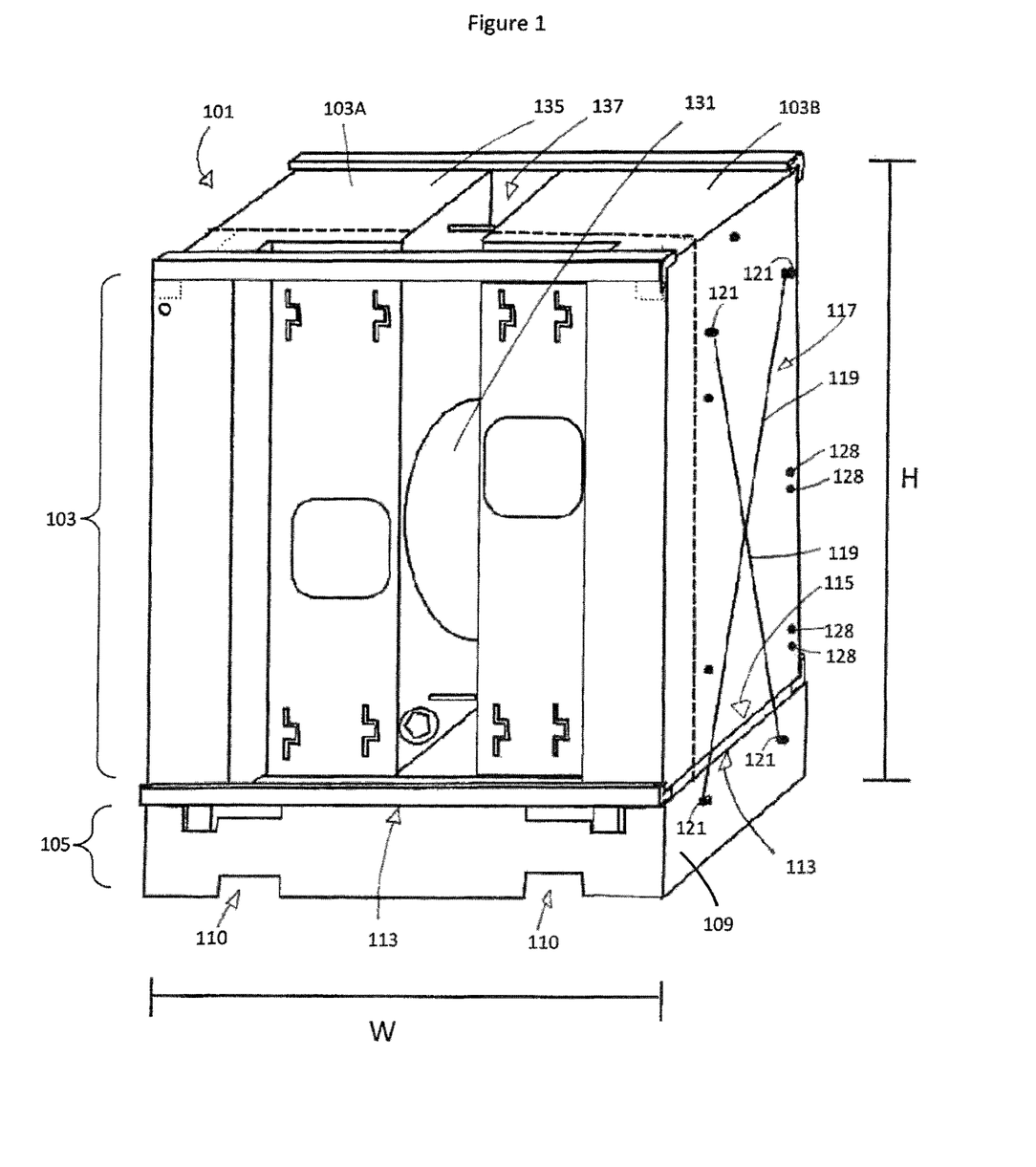
FIG. 1 shows a wave energy converter according to the present disclosure.

FIG. 1 shows the wave energy converter 101 according to the present disclosure. The wave energy converter 101 comprises a floating portion 103, for example a floating power take-off system, configured to convert wave energy into electrical energy. In the arrangement shown in FIG. 1, the wave energy converter 101 is a point absorber type wave energy converter 101. However, the wave energy converter 101 may be any appropriate type of wave energy converter 101, such as an attenuator device, an oscillating wave surge converter device, a bulge wave device and/or a rotating mass device, amongst others.

The floating power take-off system of the wave energy converter 101 is configured to absorb energy through its movements at or near to the water surface. The conversion of energy is achieved by virtue of movement of the floating portion 103 relative to an anchor portion 105, which is coupled to the floating portion 103 by a mooring line assembly 107. For example, as the floating portion 103 moves towards or away from the anchor portion 105 as a result of the rise or fall of the surface of the water, the mooring line assembly 107 acts to drive an input shaft of the power take-off system. Further details of the mooring line assembly 107 are provided below.

In the arrangement shown in FIG. 1, the wave energy converter 101 is in a transport configuration, for example a land-transport configuration, in which the floating portion 103 is mounted on the anchor portion 105. In order to enable the wave energy converter 101 to be easily transported, the anchor portion 105 comprises a transport support structure 109 configured to carry the floating portion 103. For example, the transport support structure 109 may comprise a pallet, skid, or any other appropriate platform that may be used to readily move the wave energy converter 101 when it is in the transport configuration. The anchor portion 105 may comprise any type of transport support structure 109 having one or more openings 110 configured to engage a fork of a forklift machine. In this manner, the wave energy converter 101 need not be placed onto a separate transportation platform in order to move the wave energy converter 101 around a factory or into a shipping container. Instead, the anchor portion 105 itself is configured such that standardised handling machinery, for example a forklift machine, may be used to manoeuvre the wave energy converter 101.

In the arrangement shown in FIG. 1, the transport support structure 109 functions as an anchor for the floating portion 103. The transport support structure 109 may have dimensions similar to that of a standard pallet and may be fabricated from metal, for example iron and/or iron alloy, such that the overall mass of the transport support structure 109 is sufficient for the transport support structure 109 to function as the anchor for the floating portion 103. It can be seen, therefore, that the anchor portion 105 is configured to function as a base of the wave energy converter 101 when in the transport configuration, and as the anchor for the floating portion 103 when the wave energy converter 101 is deployed at sea.

Figures 2A, 2B:
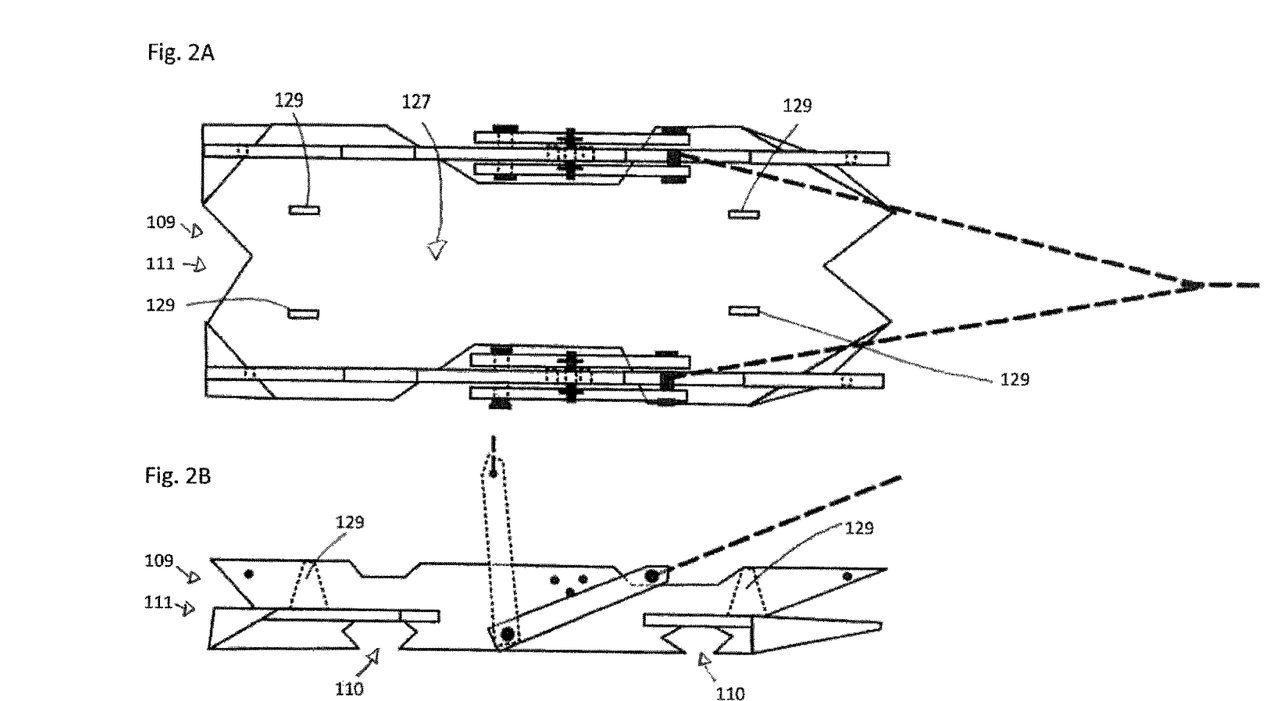
FIGS. 2A to 2D show various views of an anchor portion for a wave energy converter.
Figure 2C:
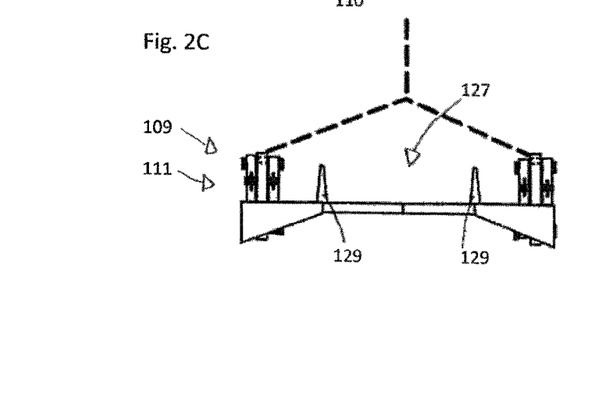
Figure 2D:
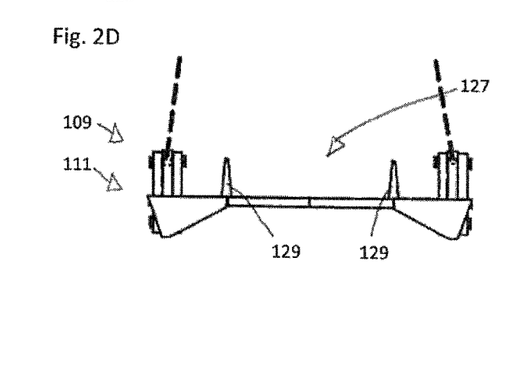

The anchor portion 105 may comprise a dead-weight anchor, a drag embedment anchor 111, a mushroom anchor with heave plates, and/or any other appropriate type of anchor system. In the arrangement shown in FIG. 1, the transport support structure 109 comprises a deadweight anchor. However, as shown in FIG. 2, the transport support structure 109 comprises a drag embedment anchor 111. It is understood, therefore, that the anchor portion 105 may take any appropriate form that allows the anchor portion 105 to function both as a base of the wave energy converter 101 when the wave energy converter 101 is in the transport configuration, and as the anchor of the floating portion 103 of the wave energy converter 101 when the wave energy converter 101 is deployed in water.

In the arrangements shown in FIGS. 1 and 2, the transport support structure 109 is configured to anchor the floating portion 103 when the wave energy converter 101 is deployed in water. However, in another arrangement, the transport support structure 109 may comprise a frame that is configured to carry the floating portion 103, but is not of sufficient mass to anchor the floating portion 103 by itself. In order to provide sufficient anchoring means for the floating portion 103, the anchor portion 105 may comprise one or more separate anchors, which may be coupled to the portable structure and/or deployable from the transport support structure 109. For example, the transport support structure 109 may be configured to house a separate anchor, such as mushroom anchor, that is released from the transport support structure 109 upon deployment of the wave energy converter 101 in water. In this manner, the anchor portion 105 is configured to function as a base of the wave energy converter 101 when in the transport configuration, and as the anchor for the floating portion 103 when the wave energy converter 101 is deployed at sea.

In one or more other arrangements, the anchor portion 105 may comprise one or more deadweight anchors, heave plates and/or drag embedment anchors, which are nested together when the wave energy converter 101 is in the transport configuration, and which become separated from one another when the wave energy converter 101 is deployed in water. For example, the anchor portion 105 may comprise a transport support structure 109 configured to house one or more deployable anchors and/or heave plates that are only separable from the transport support structure 109 when the wave energy converter 101 is in the deployed configuration.

In the arrangement shown in FIG. 1, the wave energy converter 101 has a footprint no bigger than that of the anchor portion 105. For example, the wave energy converter 101 may be configured such that the floating portion 103 does not overhang the edges of the anchor portion 105 when the floating portion 103 is mounted on the anchor portion 105. One common problem with wave energy converters is packaging the device such that they may be transported easily using standardised methods. For example, existing devices, such as those with the piston pump power take-offs or linear generators, require a long housing which exceeds the dimensions of a standard pallet, and in some cases, the dimensions of a standard shipping container in which the wave energy converters may be transported. The wave energy converter 101 according to the present disclosure, therefore, permits standardised handling of the wave energy converter 101 during transit, which is advantageous as it permits multiple wave energy converters 101 to be stored and transported in standardised shipping containers and/or handling equipment. For example, the International Organisation for Standardisation (ISO) sanctions six pallet dimensions for use with ISO shipping containers. The palletisation of the wave energy converter 101 therefore allows for the standardised containerisation of the wave energy converter 101, which greatly reduces transportation costs associated with installing a wave energy converter 101.

In one arrangement, the wave energy converter 101 may be configured so that its footprint is similar to the size of a double ISO pallet. In particular, the width W of the wave energy converter 101 may be just shorter than a width of an opening to an ISO shipping container. In a similar manner, the height H of the wave energy converter 101 may be such that it is just below the door height of the standard ISO shipping container, when the wave energy converter 101 is in the transport configuration, as shown in FIG. 1. In one arrangement, where the ISO shipping container is a 20 foot (6.096 meter) shipping container, the wave energy converter 101, for example a wave energy converter 101 having a deadweight anchor, may be configured such that four wave energy converters 101 fit into the 20 foot shipping container when the wave energy converters 101 are in the transport configuration, for example such that four wave energy converters 101 occupy approximately 90 to 95 percent of the load space of the shipping container. In such an example, the wave energy converter 101, when in the transport configuration, may be configured such that the mass of the wave energy converter 101 divides substantially equally into the maximum allowable load for the ISO shipping container. For example, if the payload capacity of the 20 foot shipping container is 25,000 kg, the wave energy converter 101 may be configured such that the mass of an individual wave energy converter 101 is less than approximately 6,250 kg.

In another arrangement, where the ISO shipping container is a 40 foot (12.192 meter) shipping container, the wave energy converter 101, for example a wave energy converter 101 having a drag embedment anchor 111, a heave plate anchor and/or a mushroom anchor, may be configured such that eight wave energy converters 101 fit into the 40 foot shipping container when the wave energy converters 101 are in the transport configuration, for example such that eight wave energy converters 101 occupy approximately 90 to 95 percent of the load space of the shipping container. Since the 20 foot shipping container and a 40 foot shipping container have approximately equal payload capacities, for example 25,000 kg, the wave energy converter 101 may be configured such that the mass of an individual wave energy converter 101 is less than approximately 3,125 kg. In this manner, it is possible to pack eight units of the wave energy converters 101 having a drag embedment anchor 111, a heave plate anchor and/or a mushroom anchor, with the same high spatial packing efficiency as the deadweight anchor configuration in a 20 foot shipping container. Although cost savings are not made on the sea route as most transport providers charge by volume, when transported by road, large fuel and labour cost savings are made as the transport provider may reduce the number of empty return journeys. It is appreciated, however, that the shipping container may be loaded with one or more differently configured wave energy converters 101.

Whilst reference has been made to ISO standardised pallet and shipping containers, it is understood that the present disclosure applies equally to any other standardised and non-standardized sizing of pallets and shipping containers.

In the arrangement shown in FIG. 1, the wave energy converter 101 is in the transport configuration, in which a side face 113 of the floating portion 103 is secured to the top face 115 of the anchor portion 105. In other words, a vertical plane of the floating portion 103 is perpendicular, or approximately perpendicular, to a vertical plane of the anchor portion 105 when the wave energy converter 101 is in the transport configuration. It is advantageous to package the wave energy converter 101 in such a manner since the footprint of the floating portion 103 is smaller when is it stood on its side compared to when it is stood on its base. For example, if the floating portion 103 were to be transported in a top-up configuration, the footprint of the floating portion 103 would be larger, which would increase the footprint of the wave energy converter 101 inside a shipping container. Packaging the floating portion 103 in a side-up manner, therefore, helps to minimise the floor area required to store the wave energy converter 101. Furthermore, it is advantageous to configure the wave energy converter 101 such that the side face 113 of the floating portion 103 has a similar form, for example size and shape, to the top face 115 of the anchor portion 105, in order to ensure that the floating portion 103 does not overhang the edges of the anchor portion 105 when the wave energy converter 101 is in the transport configuration. It is understood, however, that the floating portion 103 may be secured to the anchor portion 105 in any appropriate orientation that enables the efficient palletisation and/or containerisation of the wave energy converter 101.

As stated above, the wave energy converter 101 has a transport configuration, in which the floating portion 103 is mounted on the anchor portion 105. Further, the wave energy converter 101 has a deployed configuration, in which the floating portion 103 is separated from the anchor portion 105. In order to avoid the floating portion 103 becoming inadvertently separated from the anchor portion 105, the wave energy converter 101 may comprise a securing mechanism 117 configured to removably secure the floating portion 103 to the anchor portion 105. The securing mechanism 117 may be configured to effect the release of the anchor portion 105 from the floating portion 103 when the wave energy converter 101 is in the water, i.e. to allow the wave energy converter 101 to change from the transport configuration to the deployed configuration. In the arrangement shown in FIG. 1, the securing mechanism 117 comprises a plurality of securing members 119, for example cables, which connect to projections 121, for example pins, provided on the floating portion 103 and the anchor portion 105. The cables may be coupled to one or more tensioning devices, for example a threaded mechanism and/or a ratcheting mechanism, configured to increase the tension in the cables so that the floating portion 103 is secured to the anchor portion 105. The securing mechanism 117 may, however, be any appropriate type of securing mechanism 117, for example a latch, that is configured to lock the floating portion 103 to the anchor portion 105. In one arrangement, the pins, in combination with the holes in which the pins fit, may be used to help manoeuvre the floating portion 103 and/or the anchor portion 105 during the assembly of the wave energy converter 101.

Figures 3A, 3B, 3C, 3D:
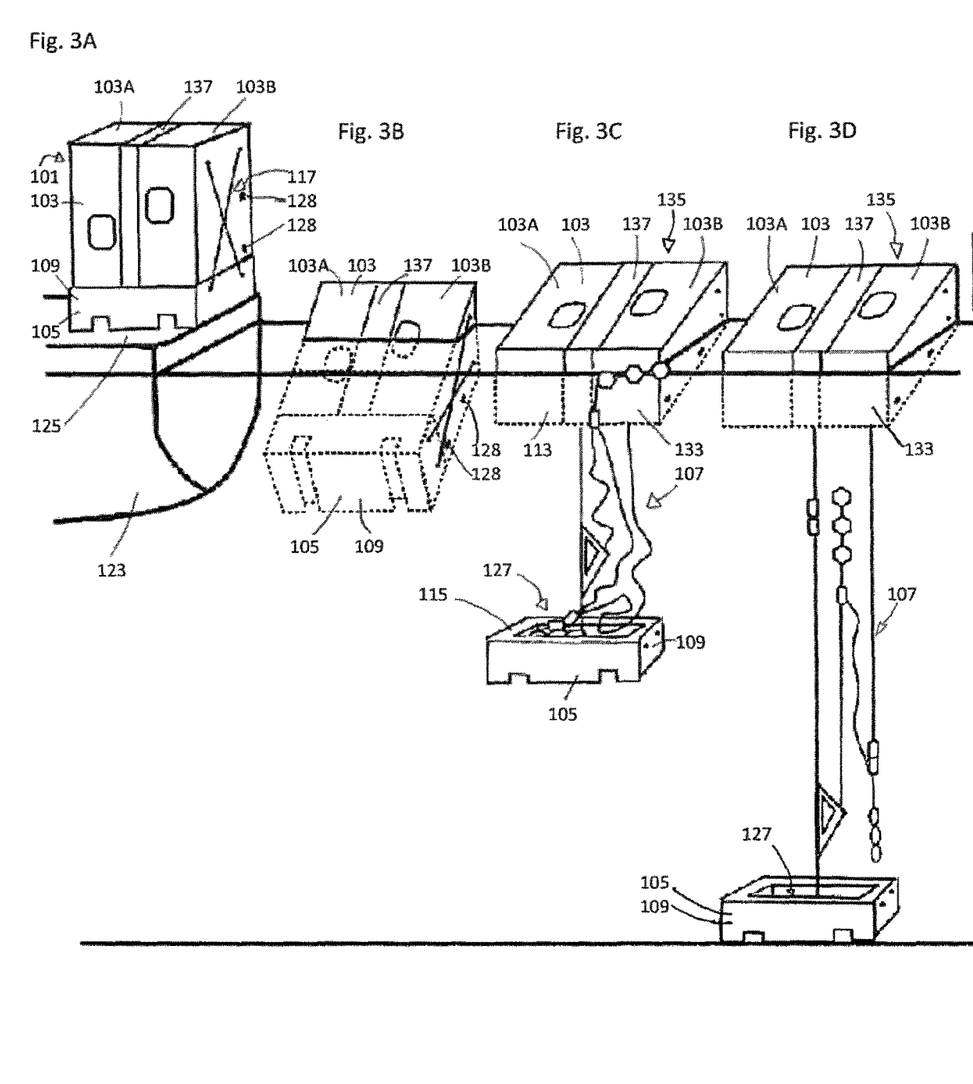
FIGS. 3A to 3E show an example of a method of deploying the wave energy converter at sea.

FIGS. 3A to 3E show an example method of deployment of the wave energy converter 101 from a marine vessel 123. In FIG. 3A, the wave energy converter 101 is positioned on the deck 125 of the marine vessel, awaiting deployment into the water. In FIG. 3A the wave energy converter 101 is in a transport configuration, which means that the wave energy converter 101 can be easily moved around the deck 125 of the marine vessel 123, for example using unmodified fork lift machinery.

In FIG. 3B, the wave energy converter 101 has been moved into the water, for example using a crane or by simply pushing the wave energy converter 101 overboard. One of the advantages of the wave energy converter 101 according to the present disclosure is that the buoyancy of the floating portion 103 is sufficient to support the weight of the anchor portion 105 when deployed in water. As such, the wave energy converter 101 need not be supported by any additional means when the wave energy converter 101 is in the water in the transport configuration.

In FIG. 3C, the securing mechanism 117 has been released, which causes the anchor portion 105 to descend into the water. Importantly, separation of the anchor portion 105 from the floating portion 103 causes the mooring line assembly 107 to be deployed from the wave energy converter 101. An advantage of the wave energy converter 101 is that the mooring line assembly 107 is housed in a pre-configured state on and/or within the wave energy converter 101 when the wave energy converter 101 is in the transport configuration. As a result, the mooring line assembly 107 need not be adjusted during the deployment of the wave energy converter 101. For example, when deploying the wave energy converter 101 in water, the depth of the water at the desired location of the wave energy converter 101 may be determined. If the depth of the water is known, then the wave energy converter 101 may be provided with a mooring line assembly 107 having an appropriate operational length for the depth of the water in which it is to be placed. This is advantageous as the mooring line assembly 107 can be pre-configured and packaged on and/or within the wave energy converter 101 during transport of the wave energy converter 101 to the desired launch site. Another advantage is that the length of the mooring line assembly 107 can be measured, lain out and/or adjusted during the manufacture and assembly of the device, for example at a land-based manufacturing facility instead of on board the marine vessel 123 before deployment of the wave energy converter 101. The configuration of the mooring line assembly 107 will be discussed in further detail below.

When the wave energy converter 101 is in the transport configuration, the mooring line assembly 107 may be stored at least partially in a recess or a cut-out, for example a mooring line storage compartment 127 or mooring line locker, provided in the floating portion 103 and/or the anchor portion 105. In the arrangement shown in FIGS. 3A to 3E, a top face of the anchor portion 105 comprises the mooring line storage compartment 127 in which the mooring line assembly 107 can be stored. The mooring line assembly 107 can be packaged within the mooring line storage compartment 127 so that the mooring line assembly 107 deploys in a controlled manner upon separation of the anchor portion 105 from the floating portion 103. Additionally or alternatively, the mooring line storage compartment 127 may be provided in a bottom face of the floating portion 103. However, it is understood that the mooring line assembly 107 may be packed in any appropriate manner that effects the deployment of the mooring line assembly 107 upon separation of the floating portion 103 and the anchor portion 105.

The wave energy converter 101 may comprise one or more stowing features 129, which serve as points to which the mooring line assembly 107 may be coupled to the wave energy converter 101. In one arrangement, the stowing features 129 may comprise one or more projections around which the mooring line assembly 107 may be wrapped in order to prevent the mooring line assembly 107 from shifting about during transit and/or becoming tangled. This is advantageous as it ensures that the mooring line assembly 107 deploys in a predictable manner upon separation of the anchor portion 105 from the floating portion 103. In the arrangement shown in FIG. 2, the stowing features comprise triangular posts, which are configured so that the mooring line assembly 107 can slip away from the anchor portion 105 without getting tangled. It is understood, however, that the stowing features 129 may be of any appropriate configuration that allow the mooring line assembly 107 to be neatly packaged within and/or on the wave energy converter 101, restrict the movement of the mooring line assembly 107 during transit of the wave energy converter 101, and/or allow the mooring line assembly 107 to be released from the mooring line storage compartment 127 upon separation of the anchor portion 105 from the floating portion 103. For example, the stowing features 129 may comprise one or more breakable members configured to secure the mooring line assembly 107 to the wave energy converter 101, and break upon separation of the anchor portion 105 from the floating portion 103.

Figure 3E:
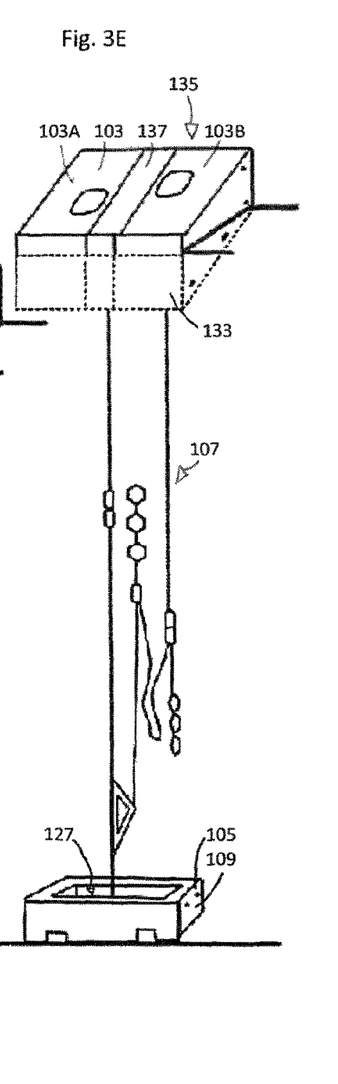

FIG. 3D shows the wave energy converter 101 in the deployed configuration with the anchor portion 105 positioned on the sea bed and the floating portion 103 positioned on the surface of the water. FIG. 3D shows the wave energy converter 101 in shallow water, for example when the wave energy converter 101 is in a wave trough, and FIG. 3E shows the wave energy converter 101 in deeper water, for example as the wave energy converter 101 rises up to a wave crest. In FIGS. 3D and 3E, the floating portion 103 is positioned, or stationed, directly above the anchor portion 105. In another arrangement, the floating portion 103 may move laterally away from the anchor portion 105 depending on the prevailing weather/tidal conditions. The mooring line assembly 107 is configured to act to reposition, or re-station, the floating portion 103 relative to the anchor portion 105.

The wave energy converter 101 has a first floating orientation when in the transport configuration as shown in FIG. 3B, and a second floating orientation when in the deployed configuration, as shown in FIGS. 3C to 3E. Importantly, the floating portion 103 has a centre of buoyancy that is laterally offset from the centroid of the floating portion 103 to cause the floating portion 103 to float in a tilted orientation. For example, the centre of buoyancy may be laterally offset from the centroid of the floating portion 103 by a distance of at least 5 percent of a maximum lateral dimension of the floating portion 103. In order to offset the centre of buoyancy, the centre of mass of the floating portion 103 is offset from the centroid of the floating portion 103. This may be achieved by positioning some of the heavier components, such as a gearbox of the PTO, towards one side of the device. Additionally or alternatively, the floating portion 103 may be provided with one or more internal recesses, for example ballast chambers, which are configured to fill with water upon deploying the wave energy converter 101 to provide ballast and help to tilt the floating portion 103 to a desired angle of tilt. The internal recesses may be configured to control the amount of water, and therefore ballast, taken on board the floating portion 103 upon deployment of the floating portion 103 in the water.

The ballast chambers may be configured to fill with water via one or more openings 128 provided in an outer surface, for example a skin or hull, of the floating portion 103. The openings in the outer surface may be positioned so that the ballast chambers automatically fill with water without the need for additional pumping of water in to the floating portion. Additionally, the ballast chambers may be configured such that they fill without trapping pockets of air. This is advantageous as the wave energy converter 101 is configured to self-orientate upon deployment, without the need for one or more active processes or operator-controlled action. In other words, the wave energy converter 101 is "water ready" when placed in the transport configuration.

Another advantage of providing the floating portion 103 with internal recesses is that the floating portion 103 is provided with a source of cooling water which may be used in a heat exchanger configured to cool one or more components of the PTO system, for example a pipe filled with hydraulic fluid. As a result of the tilt of the floating portion 103 natural convection currents are created in the ballast chambers, which can be used to draw water through a cooling system of the floating portion 103. The wave energy converter 101 according to the present disclosure therefore provides a passive cooling system that is automatically brought into operation upon the deployment of the wave energy converter 101 into the water.

As shown in FIG. 3C, the floating portion 103 rotates to lie flatter in the water upon release of the anchor portion 105, as a result of the location of the centre of buoyancy of the floating portion 103. This is advantageous, as the bottom surface of the floating body has a larger surface area than the side faces, and is therefore more appropriately configured to absorb the energy flux of a passing wave, since it increases the period for which the floating portion 103 is exposed to the energy of the wave.

A common problem with wave energy converters is that the floating portion 103 must be configured to balance the inertial effects and/or reaction forces produced by a generator of the PTO. It is known to provide a wave energy converter with one or more fins, counter floats and/or counter weights to balance the reaction forces of the generator of the PTO to ensure that the floating portion 103 does not flip over during operation. However, the wave energy converter 101 according to the present disclosure is able to balance the inertial effects and/or reaction forces generated by the PTO without the use of one or more additional fins, floats and/or weights. Instead, a generator of the PTO is offset towards one side of the floating portion, which maximises the reactionary turning moment of the floating portion 103. As a result, the floating portion 103 does not need one or more additional components to help prevent the floating portion 103 from flipping over, thus helping to maintain the size of the wave energy converter 101 within the ISO pallet and container size limits.

In one or more other arrangements, the wave energy converter 101 may comprise a plurality of generators, which may be placed towards opposite ends of the wave energy convertor 101. For example, a first generator may be disposed towards the fore of the wave energy convertor 101, and a second generator may be disposed towards the aft of the wave energy convertor 101. The first and second generators may be configured to counter rotate such that the reaction torques generated by the generators act against each other. In one arrangement, the first and second generators may be positioned so that the reaction torques generated by the generators are substantially cancelled by one another, so as to not cause the floating portion to tilt in the water as a result of the operation of the plurality of generators.

With any type of wave energy converter, it is desirable to orientate the device in relation to the direction of the wind, and hence the direction of the prevailing wave, in order to maximise the power generated from the wave energy converter 101. However, one problem with this is that the direction of the wind and therefore the wave can change. This is especially true for a point absorber type device, as an operational axis of the input shaft the PTO system should be positioned relative to prevailing conditions in order to maximise the power generated from the wave energy converter. One way of achieving this is by configuring the floating portion 103 to ensure that a fore face 133 of the floating portion 103 always faces into the prevailing conditions. It is known to provide a wave energy converter with one or more system configured to change the orientation of the PTO when deployed in water. However, such systems increase the complexity of the design and can be difficult to package, especially when optimising the wave energy converter 101 for palletisation and containerisation.

In the arrangement shown in FIGS. 3A to 3E, the centre of mass of the floating portion 103 is positioned fore of the centroid of the floating portion 103 to cause a front side of the floating portion 103 to sit lower in the water than a rear side of the floating portion 103. In other words, the fore face 133 of the floating portion 103 has a smaller surface area above the water than an aft face 135 of the floating portion 103. As a result, the floating portion 103 self-orientates in relation to the direction of the wind, and hence the prevailing wave, since the fore face 133 of the floating portion 103 presents less resistance to the prevailing wind than the aft face. The present disclosure, therefore, provides a wave energy converter 101 that is optimised for palletisation and containerisation, and is able to self-orientate in order to maximise power generation.

In the arrangement shown in FIGS. 1 and 3A to 3E, the wave energy converter 101 is substantially cuboid in form, which is at least partially a result of the wave energy converter 101 being optimised for palletisation and containerisation. In order to simplify the manufacture of the wave energy converter 101, the floating portion 103 comprises two similarly sized box-shaped housings 103A, 103B arranged to define a channel 137 therebetween. The channel 137 extends through the floating portion 103 such that the floating portion 103 is bisected into two modules. In the arrangement shown, the channel 137 extends in a fore-aft direction to define a port side module and a starboard side module. The modules are connected by at least the input shaft to the PTO system, and may be connected by one or more additional support members, such as bracing members between the corners of the respective modules. In the present disclosure, the input shaft comprises a spool 131, around which the mooring line assembly 107 is wrapped. The spool 131 is positioned in the channel 137 such that the rotational axis of the spool 131 extends in a port-starboard direction, such that the mooring line assembly 107 is coupled to the spool in a fore-aft direction. For example, during operation of the wave energy converter 101, the mooring line assembly 107 will be tensioned towards the anchor portion 105 from the fore side of the spool 131. In one arrangement, the rotational axis of the spool 131 may be coincident with the centroid of the floating portion 103. However, the rotational axis of the spool 131 may be positioned fore of the centroid of the floating portion 103, such that the mooring line assembly 107 acts to steer the floating portion 103 so that the fore face 133 of the floating portion 103 faces the prevailing conditions.

As the floating portion 103 shown in the appended figures is substantially cuboid in shape, the portion of each of the lateral faces of the floating portion 103 that is above the water is substantially triangular in shape when the floating portion 103 is in the deployed position. In this manner, the floating portion 103 can act as a fin to steer the floating portion 103 relative to the prevailing wind. The lateral faces that act to steer the floating portion 103 do so because the portion of each of the lateral faces that is above the water has a larger surface area aft of the centroid of the floating portion 103, which is a result of the tilt of the floating portion 103, and the spool being tensioned on the fore side.

Further, the channel 137 between the two modules of the floating portion 103 creates a passage through which wind can travel through, which acts to orientate the floating portion 103 in line with the direction of the wind. It is important, therefore, that the channel 137 is provided such that the wind is directed through the channel 137 in a direction that is perpendicular to the rotational axis of the spool 131, in order to maximise the efficiency of the PTO system. It is known to provide the floating portion of a wave energy converter with vanes or fins that protrude from the floating portion, the fins or vanes serving to align the floating portion with the direction of the prevailing wind and/or waves. The disadvantage of providing vanes or fins is that the overall package of the floating portion is increased, which makes transportation of the wave energy converter more costly. In some situations, vanes or fins are attached to the floating portion prior to the wave energy converter being deployed into the water, for example when the wave energy converter is on the deck of the marine vessel 123, which increases the complexity of the deployment of the wave energy converter. One advantage of providing the floating portion 103 with the above described channel 137 is that the floating portion 103 does not require any supplementary features, such as fins or vanes, that protrude from the floating portion 103 of the wave energy converter 101. In this manner, the wave energy converter 101 according to the present disclosure is improved over known devices as it is able to self-orientate in the water without the need for any supplementary features that serve to orientate the device with respect to the wind. This is achieved by simply offsetting the centre of mass of the floating portion 103 laterally away from the centroid of the floating portion 103 and/or by providing one or more of the said channels through the floating portion 103. It is noted that each of these improvements may be achieved without compromising the palletisation and/or the containerisation of the wave energy converter 101.

Figure 4:
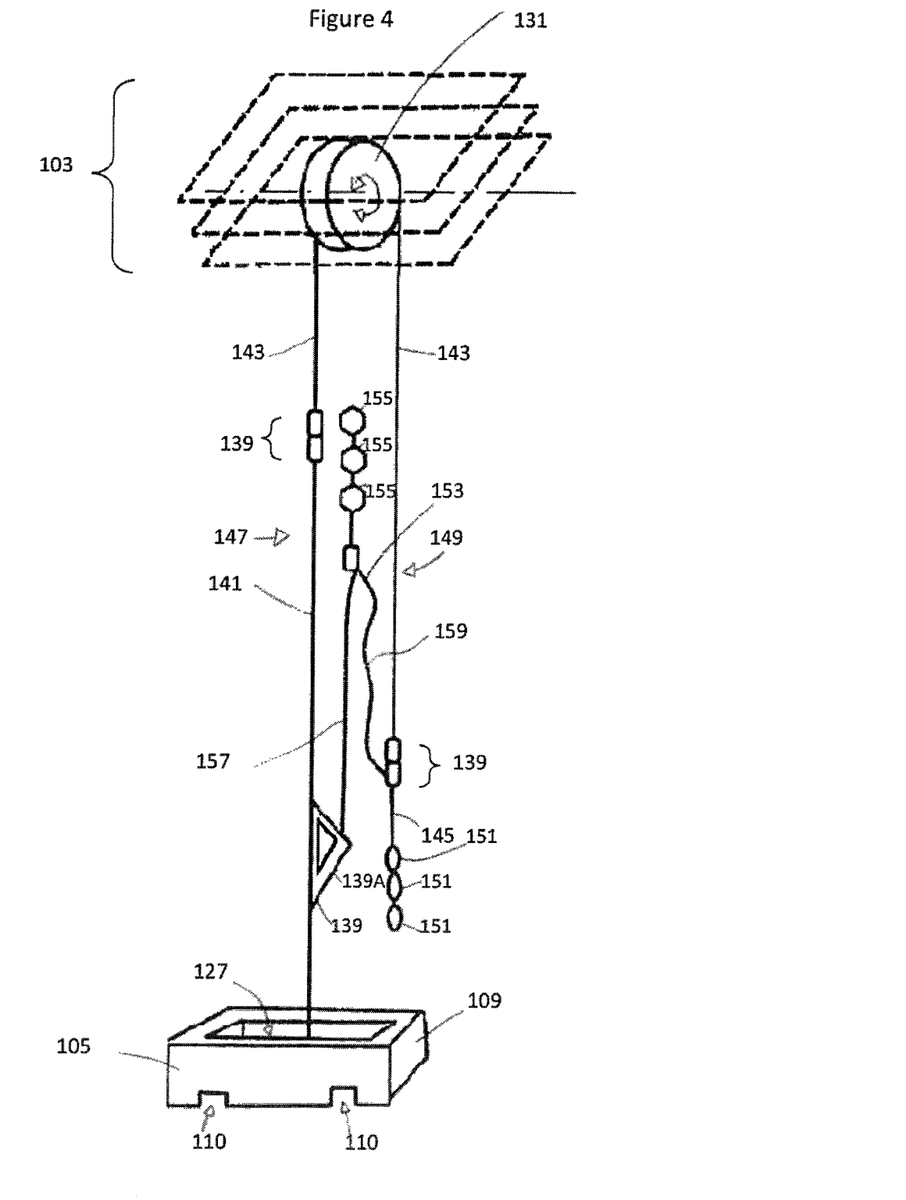
FIG. 4 shows an arrangement of a mooring line for the wave energy converter.

FIG. 4 shows further detail of the mooring line assembly 107. The mooring line assembly 107 comprises a plurality of portions that are couplable to one another by virtue of one or more connectors 139 to form the mooring line assembly 107. In one arrangement, the connector 139 may comprise connecting portions, for example rings, provided towards the end of respective portions of the mooring line assembly 107. In the arrangement shown in FIG. 4, the mooring line assembly 107 comprises an anchor line 141, a drive line 143 and a re-station line 145. It is understood, however, that the mooring line assembly 107 is not limited to having these three portion of line, and that the mooring line assembly 107 may comprise any appropriate number and/or type of components.

The anchor line 141 is configured to couple the anchor portion 105 to the drive line 143. The anchor line 141 may be configured to attach directly to anchor portion 105, for example the anchor line 141 may be configured to attach directly to the transport support structure 109 and/or a separate anchor of the anchor portion 105. Where the anchor portion 105 comprises a set of nested heave plates and/or drag-embedment anchors 111, the anchor line 141 may be coupled to, for example by extending though an opening in, at least one of the set of nested heave plates and/or drag-embedment anchors 111. In this manner, as the anchor portion 105 separates from the floating portion 103, at least one of the set of nested heave plates and/or drag-embedment anchors 111 may deploy from the anchor portion 105 and slide along a length of the anchor line 141.

The drive line 143 is configured to connect the anchor line 141 to the re-station line 145. The drive line 143 extends from a coupling 139 with the anchor line 141, around the spool 131 of the floating portion 103, and to another coupling 139 with the re-station line 145. In the arrangement shown in FIG. 4, the portion of the mooring line assembly 107 that extends up to the spool from the anchor portion 105 is referred to as an ascending portion 147 of the mooring line assembly 107, and the portion of the mooring line assembly 107 that extends down from the spool 131 to the re-station line 145 is referred to as a descending portion 149 of the mooring line assembly 107. During normal operation of the wave energy converter 101, a section of drive line 143 is in contact with the spool so that the drive line 143 can serve to rotate the input shaft of the PTO system as the floating portion 103 rises or falls with the wave. The section of the drive line 143 that is in contact with the spool 131 may be sheathed, for example with a single sheath or a double sheath, in order to increase the reliability of the wave energy converter 101.

The re-station line 145 is coupled to a descending portion of the drive line 143, and comprises one or more reset weights 151 configured to act against the tension in the ascending portion 147 of the mooring line assembly 107. In order to keep the wave energy converter 101 "on station", the total mass of the mooring line assembly 107 on the descending side 149 of the spool 131 is slightly more than the total mass of the mooring line assembly 107 on the ascending side 147 of the spool 147, when the floating portion 103 is spooled as far as possible away from the anchor portion 105. For example, as the floating portion 103 moves "off station", i.e. away from the anchor portion 105, the ascending portion 147 of mooring line assembly 107 becomes longer and the reset weights 151 rise towards the spool 131. When the reset weights 151 are positioned near to the spool 131, the total mass of the mooring line assembly 107 on the descending side 149 is still large enough to act against the tension in the ascending side 147 to cause the floating portion 103 to return towards the anchor portion 105.

The mooring line assembly 107 further comprises a tethering line 153 configured to connect the anchor line 141 to the re-station line 145. The tethering line 153 is configured to prevent the floating portion 103 from moving too far off station. The tethering line 153 comprises a first end that is coupled to the ascending portion 147 of the mooring line assembly 107, and a second end coupled to the descending portion 149 of the mooring line assembly 107. In this manner, the tethering line 153 is configured to prevent the drive line 143 from pulling out too far and the reset weights 151 from rising into the spool 131, or even pulling the drive line 143 off the spool 131 completely. In the arrangement shown in FIG. 4, the first end of the tethering line 153 is coupled to the anchor line 141 by virtue of the connector 139, for example an anti-tangle connector 139A, and the second end of the tethering line 153 is coupled to the re-station line 145 by virtue of another connector 139, for example the connector 139 that couples the drive line 143 to the re-station line 145. The length of the tethering line 153 is selected to determine the maximum distance by which the floating portion 103 can move off station. For example, during normal operating conditions the tethering line 153 is slack, and when the floating portion 103 reaches the maximum desired off station distance, the tethering line 153 becomes tensioned to prevent further upward movement of the descending portion 149 of the mooring line assembly 107. It can be seen, therefore, that the tethering line 153 joins the two ends of the mooring line assembly 107 to each other, forming a secondary loop around the spool 131, such that the descending portion 149 of the mooring line assembly 107 cannot fully unwind from the spool 131.

The tethering line 153 comprises one or more floats 155 configured to prevent the tethering line 153 from touching the sea bed. This is beneficial as it prevents the tethering line 153 from becoming tangled or snagged on an item on the sea bed, which would unduly limit the travel of the mooring line assembly 107. In the arrangement shown in FIG. 4, the floats 155 are coupled to the tethering line 153 such that the buoyancy force of the floats 155 acts against the connector 139A, and not against the weights 151 on the re-station line 145. As result, the tethering line 153 comprises a first portion 157 that is tensioned against the connector 139A, and a second portion 159 that is slack during normal operation of the wave energy converter 101 and becomes tensioned against the descending portion 143 of the mooring line assembly 107 only when the floating portion 103 is maximally off-station.

In one arrangement, enough slack may be provided in the tethering line 153 to accommodate the highest possible waves at the installation site. The mooring line assembly 107 may be rated to withstand the force of buoyancy of the floating portion 103 if the slack portion of the tethering line 153 has become completely extended and the floating portion 103 has become completely submerged below the wave crest, for example during a super storm. Due to the relatively small size of the wave energy converter 101 compared to much larger known wave energy converters, a relatively thin steel cable can withstand the force of buoyancy of the floating portion 103, which helps to reduce the mass of the wave energy converter 101.

The weights 151 of the re-station line 143 and/or the floats 155 of the tethering line 153 are configured to provide sufficient force to perform their respective functions. If the weights 151 and the floats 155 were to be formed of a single weight or float, the size of the weight or the float would be too bulky to fit inside the mooring line storage compartment 127 of the wave energy converter 101. In order to package the weights 151 and the floats 155 of the mooring line assembly 107 in the mooring line storage compartment 127, the weights 151 and the floats 155 are formed from a plurality of smaller weights or floats, which can be neatly packaged within the mooring line storage compartment 127 when in the transport configuration. This approach allows the total mass of the reset weights 151 and/or that total buoyancy of the tethering line 153 floats 155 to be varied by bespoke amounts depending upon the desired launch site of the wave energy converter 101. For example, the number of weights 151 and/or floats 155 may be varied at the point of factory assembly according to a pre-installation site survey. In deep water, the mooring line assembly 107 may comprise six weights 151 and six floats 155, where as in shallower water, the mooring line assembly 107 may comprise four weights 151 and four floats 155. In this manner, the mooring line assembly 107 is optimised for palletisation and/or containerization, as well as facilitating readily achievable customisation of the wave energy converter 101 at the point of manufacture.

In the arrangement shown in FIG. 4, the tethering line 153 is coupled to the anchor line 141 by virtue of the anti-tangle connector 139A. The anti-tangle connector 139A is axially fixed relative to the anchor line 141 so that the anti-tangle connector 139A is unable to slide along the length of the anchor line 141. The anti-tangle connector 139A is rotationally coupled to the anchor line 141 so that at least a portion of the anti-tangle connector 139A, and hence the tethering line 153 and the descending portion 149 of the mooring line assembly 107, are able to rotate about the anchor line 141 without snagging. In this manner, the ascending 147 and descending sides 149 of the mooring line assembly 107 do not become tangled with each other when the waves change direction and the floating portion 103 turns to face oncoming waves.

The anti-tangle connector 139A may be any appropriate shape. For example, the anti-tangle connector 139A may be a ring, triangle, a T-bar, or any other shape to act as to space the tethering line 153 from the ascending portion 147 of the mooring line assembly 107. The anti-tangle connector 139A may be configured to withstand the tension in the mooring line assembly 107 between the anchor portion 105 and floating portion 103, and also attach the ascending portion 147 of the mooring line assembly 107 to the descending portion 149 of the mooring line assembly 107, for example, by virtue of the tethering line 153.

The wave energy converter 101 according to the present disclosure is advantageous as the mooring and drive functions are performed by a single mooring line assembly 107, which saves space and allows all of the mooring line assembly 107, and the accompanying floats 155 and weights 151, to be packaged inside the wave energy converter 101 in the transport configuration.

In the arrangement shown in FIG. 4, the anchor portion 105 comprises a pallet anchor having an internal hollow space that acts as a space to stow the mooring line assembly 107, which includes the anchor line 141, the drive line 143, the restationing line 145, the tethering line 153, the weights 151, the floats 155 and the anti-tangle connector 139A. In one or more other arrangements, the mooring line assembly 107 may comprise any appropriate number and/or type of components. As such, the mooring line storage compartment 127 may be configured to house the respective components of the mooring line assembly 107, which enables the wave energy converter 101 to be palletised and deployed in the above-described manner. In contrast, known wave energy devices are unable to be palletised because the mooring lines and anchors are assembled onto the unit at the launch site. By providing an integrated mooring line storage compartment 127 within the pallet anchor, wave energy converter 101 is able carry a long enough mooring line assembly 107 for launch sites up to approximately 100 m depth to the seabed. For example, due to ascending/descending configuration of the mooring line assembly 107, for a wave energy converter 101 to be moored on a site with a seabed depth of 30 m, and with a maximum wave height of 7 m, the mooring line assembly 107 would be approximately 70 m in total length. Alternatively, for a wave energy converter 101 to be moored on a site with a seabed depth of 100 m, and with a maximum wave height of 15 m, the mooring line assembly 107 would be approximately 170 m in total length. However, it is common for the depth of the launch site to be much shallower than 100 m, which means that there may be extra space in the mooring line storage compartment 127 for any additionally desired components. In one example, where the depth of the water at the institution site is greater than 100 m, extra line can be added at factory assembly, and coiled on one or more cleats provided on the outside of the floating portion 103 and/or the anchor portion 105.

Figure 5A:
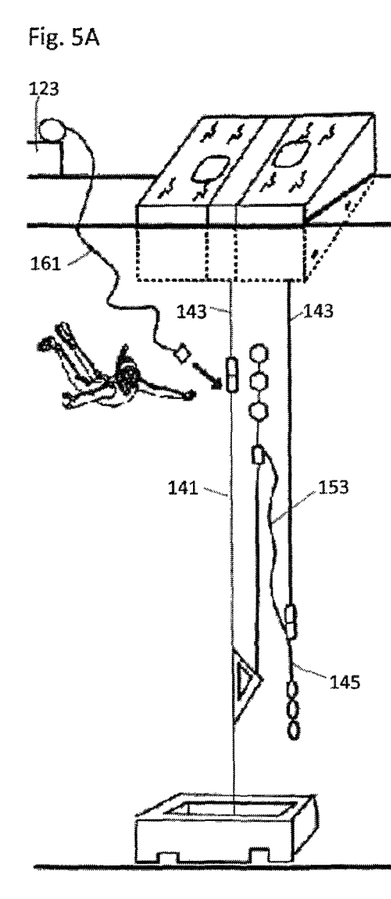
FIGS. 5A to 5C show an example method of retrieving the wave energy converter.
Figure 5B:
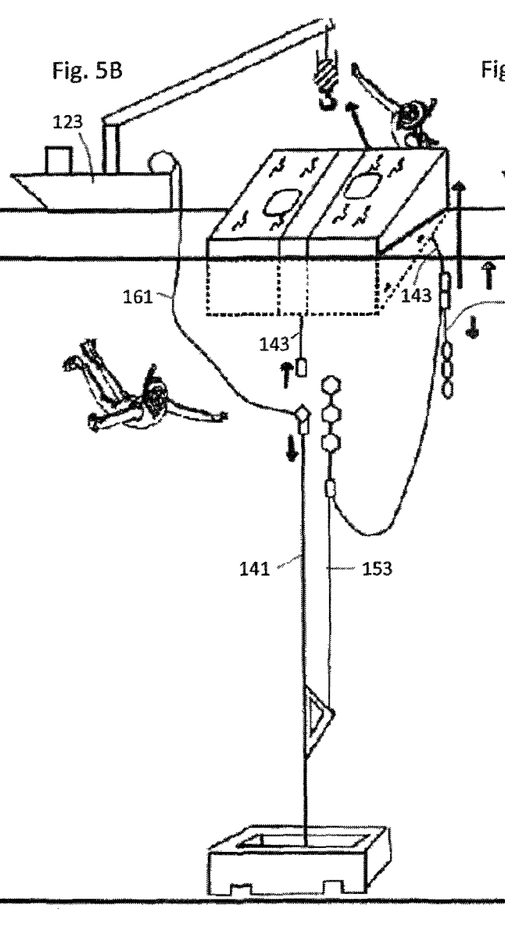
Figure 5C:
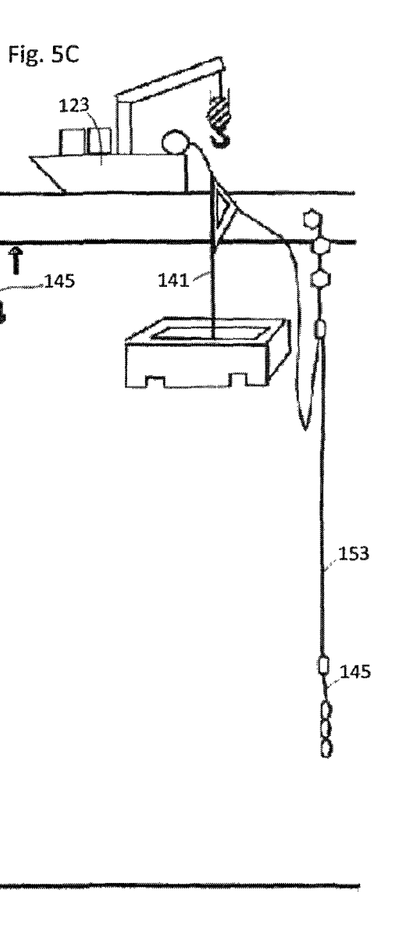
Figure 6A:
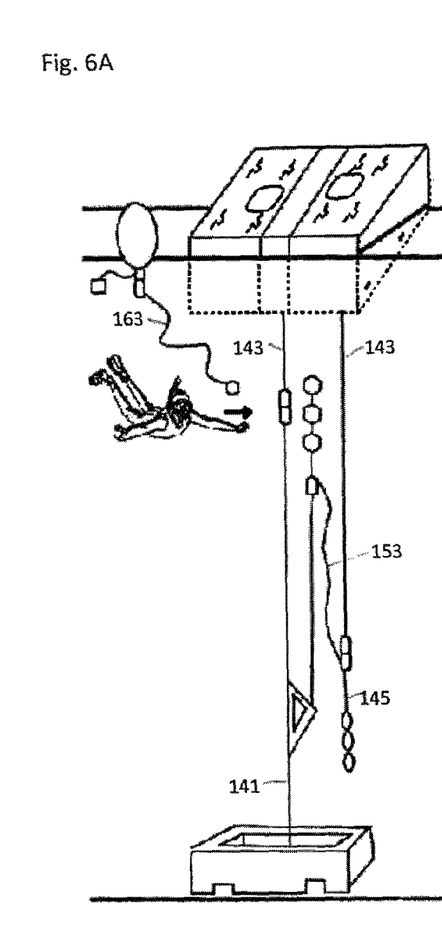
FIG. 6A to 6C show an example method of retrieving a floating portion of the wave energy converter.
Figure 6B:
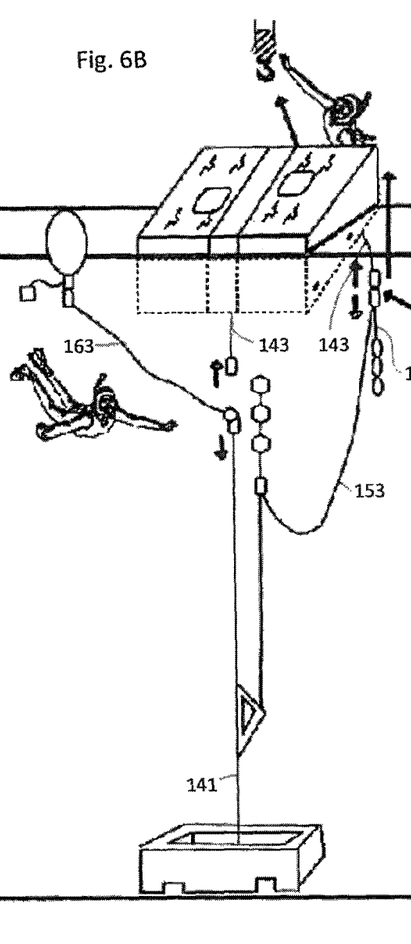
Figure 6C:
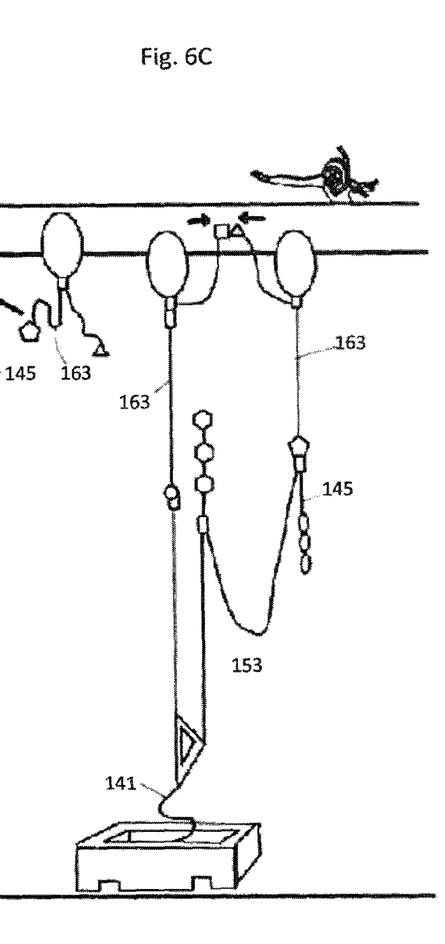

FIGS. 5A to 5C depict an example of a recovery operation of the wave energy converter 101. In FIG. 5A, an operator, such as a diver, attaches a recovery line 161, which may be on a marine vessel 123 or a marine platform, to the anchor line 141 side of the connector 139 between the anchor line 141 and the drive line 143, which secures the anchor portion 105 to the recovery line 161. In FIG. 5B, the operator disconnects the drive line 143 from the anchor line 141 and from the re-station line 145. A lifting device can then be used to lift the floating portion 103 from the water. In FIG. 5C, the anchor portion 105 may be winched up from the sea bed by virtue of the connection between the recovery line 161 and the anchor line 141. FIGS. 6A to 6C depict an example of a maintenance operation of the floating portion 103 of wave energy converter 101. In FIG. 6A, an operator, such as a diver, attaches a buoy line 163 to the anchor line 141 side of the connector 139 between the anchor line 141 and the drive line 143, which secures the anchor portion 105 to the buoy line 163. In FIG. 6B, the operator attaches another buoy line 163 to the re-station line 145 side of the connector 139 between the drive line 143 and the re-station line 145, which secures the re-station line 145 to the other buoy line 163. The operator then disconnects the drive line 143 from the anchor line 141 and from the re-station line 145, which allows the floating portion 103 to be lifted from the water. Additionally, the buoy lines 163 may be secured to each other to prevent the anchor line 141 and the re-station line 145 from drifting apart, as shown in FIG. 6C.

In another recover/maintenance operation (not shown) the PTO of the floating portion 103 may be configured to winch the anchor portion 105 up from the sea bed. For example, the power generated by the floating portion 103 may be used to power the spool 131 to wind in the ascending portion 147 of the mooring line assembly 107, and hence the anchor portion 105. Additionally or alternatively, a drive shaft of the PTO may be connected to an external motor such that when the external motor is activated, the spool 131 winds up the ascending portion 147 of the mooring line assembly 107. In this manner, the anchor portion 105 can then be re-secured to the floating portion 103, and the entire wave energy converter 101 be lifted out of the water.

It is understood that the recovery and/or maintenance operations shown in FIGS. 5A to 5C and 6A to 6C respectively are not limited to the described operations. Indeed, the recovery and/or maintenance operations may incorporate any appropriate number and/or type of operations that allow for the removal of the floating portion 103 and/or the anchor portion 105 from the water. The wave energy converter 101 according to the present disclosure is advantageous as it comprises a modular system that not only allows for bespoke assembly at a manufacturing site, the palletisation and/or containerisation of the wave energy converter 101, but also for the straightforward recovery and/or maintenance of one or more portions of the wave energy converter 101 once deployed at sea.

It will be appreciated by those skilled in the art that although the invention has been described by way of example with reference to one or more arrangements, it is not limited to the disclosed arrangements and that alternative arrangements could be constructed without departing from the scope of the invention as defined by the appended claims.

The invention claimed is:

1. A wave energy converter comprising:
   a floating portion; and
   an anchor portion, wherein the anchor portion comprises a transport support structure configured to carry the floating portion,
   wherein the floating portion has a center of buoyancy that is laterally offset from a centroid of the floating portion by a distance of at least five percent of a maximum lateral dimension of the floating portion when the floating portion is in water, such that the floating portion sits in a tilted position when deployed in the water.

2. A wave energy converter according to claim 1, wherein the transport support structure comprises a pallet or a skid.

3. A wave energy converter according to claim 1, wherein the wave energy converter has a transport configuration in which the floating portion is mounted on the anchor portion.

4. A wave energy converter according to claim 3, wherein a vertical plane of the floating portion is perpendicular to a vertical plane of the anchor portion when the wave energy converter is in the transport configuration.

5. A wave energy converter according to claim 3, wherein the wave energy converter has an overall height less than a height of an opening to an ISO shipping container when the wave energy converter is in the transport configuration.

6. A wave energy converter according to claim 3, wherein the wave energy converter has an overall width less than a width of an opening to an ISO shipping container when the wave energy converter is in the transport configuration.

7. A wave energy converter according to claim 3, wherein the anchor portion functions as a base of the wave energy converter when the wave energy converter is in the transport configuration.

8. A wave energy converter according to claim 1, wherein the wave energy converter has a deployed configuration in which the floating portion is separated from the anchor portion.

9. A wave energy converter according to claim 1, wherein the wave energy converter comprises a securing mechanism configured to removably secure the floating portion to the anchor portion.

10. A wave energy converter according to claim 9, wherein release of the securing mechanism allows the wave energy converter to change from a transport configuration to a deployed configuration.

11. A wave energy converter according to claim 1, wherein the floating portion is sufficiently buoyant to support a weight of the anchor portion when deployed in water.

12. A wave energy converter according to claim 1, wherein a side profile of the floating portion is substantially similar to a top profile of the anchor portion.

13. A wave energy converter according to claim 1, wherein a volume of the floating portion is greater than a volume of the anchor portion.

14. A wave energy converter according to claim 1, wherein the anchor portion comprises at least one opening configured to engage a lifting assembly of a mechanical handler.

15. A wave energy converter according to claim 1, wherein the floating portion and the anchor portion are connected by a mooring line assembly comprising at least a drive portion, an anchor line, and a re-station portion.

16. A wave energy converter according to claim 15, wherein the mooring line assembly is attached to the floating portion and the anchor portion when the wave energy converter is in a transport configuration.

17. A wave energy converter according to claim 15, wherein the wave energy convertor comprises at least one projection configured to locate the mooring line assembly when the mooring line assembly is stowed on the wave energy converter.

18. A wave energy converter according to claim 15, wherein the mooring line assembly is deployed from the wave energy converter upon separation of the floating portion from the anchor portion.

19. A wave energy converter according to claim 15, wherein the wave energy converter comprises a recess configured to stow the mooring line assembly.

20. A wave energy converter according to claim 19, wherein the anchor portion comprises the recess.

21. A wave energy converter according to claim 1, wherein an external geometry of the floating portion is substantially cuboid.

22. A wave energy converter according to claim 1, wherein the anchor portion comprises at least one of a deadweight anchor, a drag-embedment anchor, a mushroom anchor, and a heave plate.

23. A wave energy converter according to claim 1, wherein the floating portion comprises a power take-off.

24. A wave energy converter according to claim 23, wherein a rotational axis of the power take-off is offset laterally from the centroid of the floating portion.

25. A wave energy converter according to claim 1, wherein the floating portion comprises a channel extending through the floating portion.

26. A wave energy converter according to claim 25, wherein the channel bisects the floating portion.

27. A wave energy converter according to claim 25, wherein at least a portion of a spool of a power take-off is disposed in the channel.

28. A wave energy converter according to claim 27, wherein the channel extends in a direction that is perpendicular to a rotational axis of the spool.

29. A wave energy converter according to claim 1, wherein the floating portion is ballasted to offset the center of mass of the floating portion laterally away from the centroid of the floating portion.

30. A wave energy converter according to claim 29, wherein the ballast is located such that the center of mass of the floating portion is offset by a distance of at least five percent of the maximum lateral dimension of the floating portion.

31. A wave energy converter according to claim 1, wherein the floating portion comprises one or more internal recesses configured to fill with water upon deployment of the wave energy converter into water.

32. A wave energy converter according to claim 31, wherein the internal recess, when filled with water, provides a source of water that is used in a heat exchanger configured to cool one or more components of the wave energy converter.

33. A method of deploying a wave energy converter comprising a floating portion and an anchor portion, the anchor portion comprising a transport support structure, the method comprising the steps of:
    carrying the floating portion using the anchor portion; and
    positioning the floating portion in water in a tilted position by laterally offsetting a center of buoyancy of the floating portion from a centroid of the floating portion by a distance of at least five percent of a maximum lateral dimension of the floating portion.

34. A method according to claim 33, the method comprising the steps of securing the anchor portion to the floating portion to define a transport configuration of the wave energy converter, launching the wave energy converter into water, and releasing the anchor portion from the floating portion to define a deployed configuration of the wave energy converter.

35. A method according to claim 33, the method comprising the step of releasing the anchor portion from the floating portion to cause the floating portion to re-orientate in the water.

36. A method according to claim 33, the method comprising the step of releasing the anchor portion from the floating portion to cause the anchor portion to fall into the water.

37. A method according to claim 33, wherein the anchor portion and the floating portion are connected by a mooring line assembly, the method comprising the step of releasing the anchor portion from the floating portion to cause the mooring line assembly to be deployed from the wave energy converter.

38. A method according to claim 37, the method comprising the step of determining the length of the mooring line assembly before securing the anchor portion to the floating portion.

* * * * *